Nov. 24, 1970     R. M. FIANDT     3,542,599
DEFERRED ACTION BATTERY
Filed Sept. 5, 1968
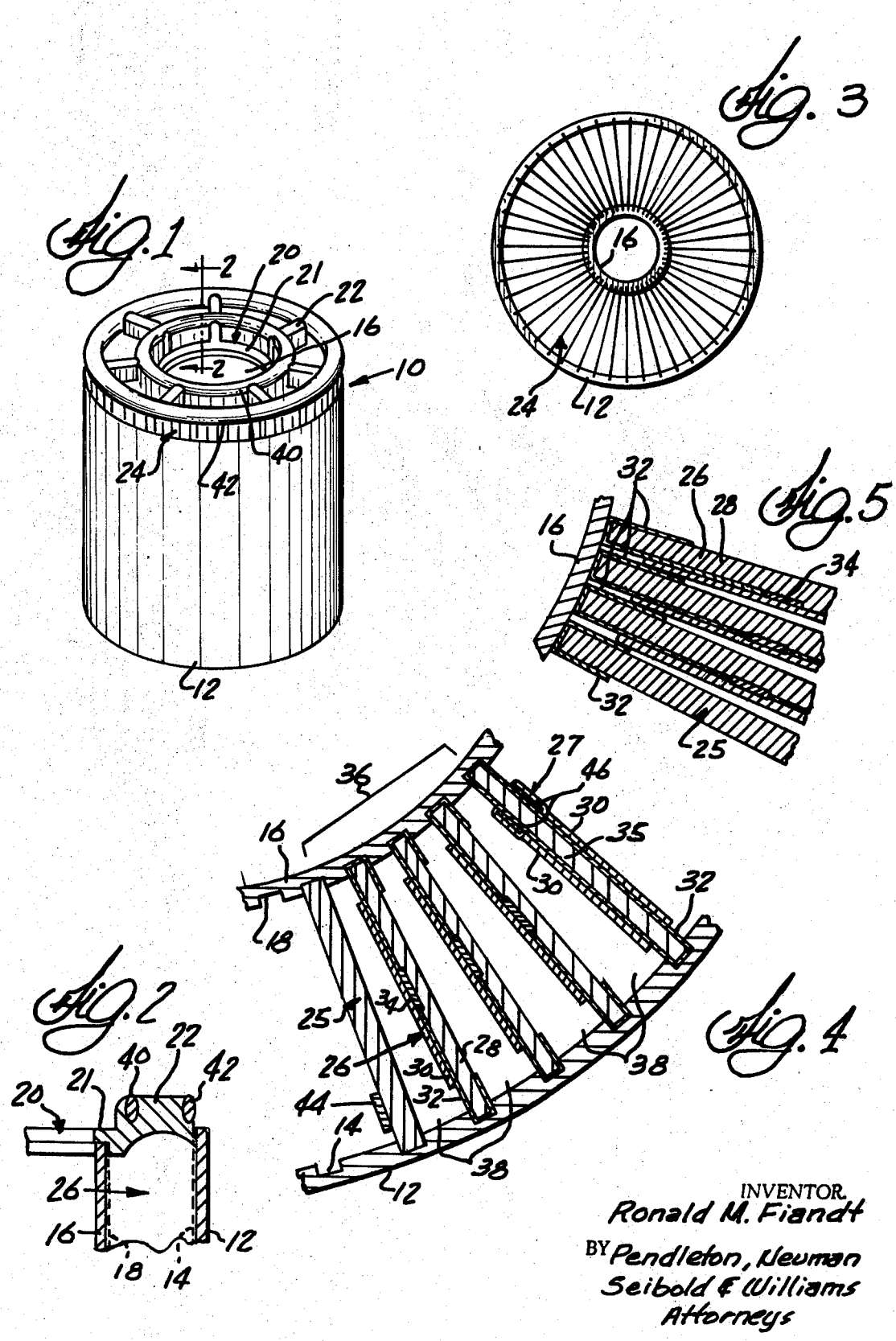
INVENTOR.
Ronald M. Fiandt
BY Pendleton, Neuman
Seibold & Williams
Attorneys

United States Patent Office 3,542,599
Patented Nov. 24, 1970

3,542,599
DEFERRED ACTION BATTERY
Ronald M. Fiandt, Menomonee Falls, Wis., assignor to Globe-Union Inc., Milwaukee, Wis., a corporation of Delaware
Filed Sept. 5, 1968, Ser. No. 757,611
Int. Cl. H01m 17/06, 17/00
U.S. Cl. 136—112
15 Claims

ABSTRACT OF THE DISCLOSURE

A deferred action battery adapted for activation by immersion in an electrolyte, such as salt water, a typical embodiment of the battery having a nonconductive tubular jacket with grooves on its inside surface and a nonconductive tubular core member, smaller than the jacket, with grooves on its outside surface. Means, such as a radial arm spider bracket, serves to maintain the core member and jacket in spaced coaxial relationship with respect to one another, and a plurality of rectilinear, platelike electrodes are disposed in radial array within the grooves of the core member and the jacket. Means preferably in the form of a pair of coaxial conductor rings conduct electric current from the electrodes.

BACKGROUND OF THE INVENTION

This invention relates to a deferred action battery adapted for activation when immersed in an electrolyte. The invention has particular application to a primary battery of the type used as a source of power for torpedoes with the battery being activated by the passage of sea water therethrough. In such an application the volumetric space permitted for the battery is extremely small, and yet the battery is required to activate rapidly with maximum reliability and freedom from defects due to such factors as vibration, shock, and storage for prolonged periods under conditions of high temperature and humidity. A battery of this type is frequently required to produce, for example, a 1.7 volt potential on a 0.40 ohm load in one second in 32° F. aqueous electrolyte of 1.05% salinity and a 2.0 volt potential on the same load in 0.5 second in an electrolyte at 98° F. and 3.95% salinity. For rapid activation the electrodes of the battery are required to have a large surface area, and there is expected to be a minimum voltage drop across the electrode.

Sea water batteries usually employ silver chloride and magnesium electrodes, and in one usual construction these electrodes are in a rolled-up or "jelly roll" arrangement with some provision for spacing to prevent shorting and allow entrance of the electrolyte. The "jelly roll" system is thus a compromise between the need for a spacer means and the requirement for rapid immersion of the electrodes in order to accomplish rapid activation of the battery. With such a system there is an objectionable voltage drop from one end to the other of the electrode, and the output voltage of such a system cannot be materially altered without a major alteration in the structure of the system. A single short or disconnect will usually result in complete failure of the "jelly roll" system.

A deferred action battery constructed in accordance with this invention is reliably and rapidly activated to produce maximum voltage for its size. The electrodes exhibit a very large surface area with a minimum voltage drop. The battery may be easily constructed and includes a large number of individual electrodes. The electrodes are in bipolar assemblies mounted in a highly shock-proof manner and presenting an open construction for the free flow of electrolyte therebetween. The output voltage may be changed simply by changing the arrangement and connections of electrodes and electrode assemblies. Since there are a large number of cells, an electrode short or disconnect in one of the cells will not normally have a significant effect upon the operation of the battery.

SUMMARY OF THE INVENTION

In accordance with one embodiment of the invention, the deferred action battery adapted for activation when immersed in an electrolyte comprises a substantially tubular jacket and a substantially tubular core member smaller than the jacket and disposed coaxially within the jacket with the peripheral portions thereof being substantially uniformly spaced from the interior portions of the jacket. Means are provided for maintaining the jacket and the core member in fixed, spaced, coaxial relation with respect to one another. A plurality of electrodes extend between the core member and the jacket, and means adjacent the interior of the jacket space the outer end portions of the electrodes with respect to one another while means adjacent the exterior of the core member space the inner end portions of the electrodes with respect to one another. Thus an electrolyte may be freely passed between the spaced electrodes in a direction generally parallel to the axis of the core member and jacket. Conductor means are provided for conducting electric current from the electrodes.

The jacket and the core member are preferably cylindrical with the jacket having longitudinal grooves on its interior surface and the core member having a similar number of longitudinal grooves on its exterior surface. The electrodes are disposed in radial array with their outer end portions disposed in the grooves of the jacket and their inner end portions disposed in the grooves of the core member.

The battery is preferably a primary battery with at least some of the electrodes being combined into assemblies and most being duplexed to form bipolar electrode assemblies. Each such bipolar assembly comprises a positive plate or anode and a negative plate or cathode. The negative plates are preferably of silver chloride while the positive plates are of magnesium, and the magnesium plates are somewhat larger than the silver chloride plates, so that only the magnesium plates are disposed within and supported by the grooves in the jacket and core member.

The conductor means for the primary battery preferably include a pair of concentric conductor rings with means connecting selected positive electrodes to one conductor ring and means connecting selected negative electrodes to the other conductor ring. The electrodes may be connected in series or in parallel or in a combination of series and parallel depending upon the voltage output desired.

BRIEF DESCRIPTION OF THE DRAWING

With reference to the drawing:

FIG. 1 is a perspective view of a battery constructed in accordance with this invention;

FIG. 2 is a fragmentary sectional view taken substantially along line 2—2 of FIG. 1.

FIG. 3 is a bottom plan view of the battery illustrated in FIG. 1 showing the cylindrical jacket, the cylindrical core member and the electrodes extending in radial array therebetween;

FIG. 4 is an enlarged sectional view showing portions of the core member, the jacket and several of the individual electrodes and electrode assemblies extending therebetween;

FIG. 5 is an enlarged sectional view showing a modified means for effecting separation of the inner ends of the individual electrodes and electrode assemblies.

DESCRIPTION OF THE PREFERRED EMBODIMENTS

With reference to the drawing and particularly to FIGS. 1, 2, 3 and 4, the battery 10 constructed in accordance with one embodiment of this invention comprises a substantially cylindrical outer jacket 12 having a plurality of longitudinal grooves 14 formed on its inner surface as best illustrated in FIG. 4. The jacket 12 may be formed of any desired nonconductive material such as polypropylene or polystyrene, and it may be either rigid of flexible. Disposed within and concentric with the jacket 12 is a smaller tubular member or core member 16 having longitudinal grooves 18 formed on its exterior surface. The number and radial spacing of grooves 18 on the exterior surface of the core member 16 are preferably the same as the number and radial spacing of grooves 14 on the interior surface of the jacket 12.

The jacket 12 and the core member 16 are maintained in spaced concentric relationship with respect to one another by means of a nonconductive spider bracket 20, best shown in FIGS. 1 and 2. This spider bracket has an annular body portion 21 which is adhesively or otherwise suitably secured to the core member 16 and a plurality of radial arm 22 which extend outwardly and are adhesively or otherwise suitably secured to the surrounding jacket 12. The spider bracket 20 is preferably constructed of a rigid plastic such as a styrene-type or an acetyl-type thermo-plastic resin. This bracket is located at one end of the core member 16 and jacket 12 and prevents relative rotation between the jacket and core member. The bracket arms 22 of the bracket 20, as will be more fully described, support the electrical connectors for the electrodes.

Extending between the core member 16 and the jacket 12 are a number of rectilinear platelike electrodes 24, at least some of which are preferably combined into electrode assmblies. Each separate electrode or assembly, as the case may be, has its inner end portion disposed within a groove 18 of the core member 16 and its outer end portion disposed within a groove 14 of the jacket 12. This is best illustrated in FIG. 4. The grooves 14 and 18 thus comprise one form of spacer means for the electrodes 24.

In the illustrated embodiment some of the electrodes 24 are anodes 25, some are combined as bipolar electrode assemblies 26, and still others are combined as cathode assemblies 27. The anodes 25 are preferably constructed of magnesium.

The electrode assemblies 26 are of the duplex or bipolar type consisting of a magnesium plate or anode 28 and a silver chloride plate or cathode 30. An isolating film or layer 32 extends between the magnesium anode and the silver chloride cathode in each assembly and slightly overlaps and forms a seal with the silver foil connector strip 34 which is weld-laminated to and electrically interconnects the anode and the cathode. The isolating film 32, which may, for example, be a pressure sensitive tape, is impervious to the electrolyte and combines with the silver foil to define a cell partition wall. This prevents electrolytic action between the anode 28 and cathode 30 of each electrode assembly, and it is essential since the anode is an electrode in one cell and the cathode is an electrode in the adjacent cell. This film may encompass the edges of the magnesium anodes as illustrated in FIG. 4, although this is not essential provided it is sealed with the jacket 12 and core 16.

The magnesium anodes 28 of the electrode assemblies 26 are preferably thicker and longer than the silver chloride cathodes 30 so that only the anodes and partitions of these assmbles will fit into the grooves 14 and 18 of the jacket 12 and core member 16 respectively and provide the structural strength and separation required.

The cathode assmblies 27 preferably consist of a pair of the silver chloride plates or cathodes 30 which are secured to a larger supporting plate 35. The supporting plate 35 may be constructed of a metal such as magnesium, in which case it is completely covered with the isolating film 32, or it may be of plastic or other impervious, inert material.

The grooved construction of the core member 16 and of the jacket 12 permits a very large number of electrodes to be packed between the jacket and the core member, thus providing a very large surface area for contact with the electrolyte which will flow between the electrodes. In addition to permitting a large number of electrodes to be employed in a relatively small space, this construction permits the space between the core member 16 and jacket 12 to be quickly and easily loaded with the electrodes in the desired manner and with the desired connections being made to provide the desired output voltage for the battery.

In the embodiment illustrated in FIGS. 1–4 every fourth set of grooves in the jacket 12 and core member 16 is occupied, alternately by a magnesium anode 25 and a cathode assembly 27, with the three intermediate sets of grooves being occupied by three bipolar electrode assemblies 26. Thus between each anode 25 and cathode assembly 27 there is a battery unit 36 consisting of four series-connected voltaic cells 38, with the voltage of each cell being 1.5 volts and the voltage of each four-cell unit 36 being 4 times 1.5 or 6 volts. The entire battery 10 may, for example, contain 25 such four-cell units 36 in back-to-back relation with the units being connected in parallel. The voltage output of the battery would thus be 6 volts. This output voltage may be altered merely by increasing or decreasing the number of bipolar electrode assemblies and thus the number of voltaic cells 38 in each battery unit 36. Thus if there are only two bipolar electrode assembles 26 between each anode 25 and cathode assembly 27, the resulting units 36 will each have one less voltaic cell 38, and the unit voltage is reduced to 4.5 volts, whereas if there are five bipolar electrodes 26 in each unit 36, there will be one more voltaic cell 38, and the unit voltage is increased to 7.5 volts.

The various multicell units 36 of the battery are connected together preferably by means of a pair of concentric highly conductive bus bar rings 40 and 42. These may be constructed of silver plated copper and are best illustrated in FIG. 1. The cathode assemblies 27 are connected to one of these rings, and the anodes 25 are connected to the other. In the illustrated embodiment a highly conductive connecting tape 44 is welded to each magnesium anode 25 and then to the outer ring 42, and a similar tape 46 is weld-laminated to each of the silver chloride cathodes 30 of the cathode assemblies 27 and then to the inner ring 40. The silver chloride electrodes are preferably reduced slightly by chemical action during manufacture to render the surface conductive. The positive and negative terminals of the battery are then taken from the two respective rings. The bus bar rings 40 and 42 are disposed at one end of the battery and rest upon the radial arms 22 of the spacer member or spider bracket 20 as best illustrated in FIG. 2.

In FIG. 5 there is illustrated a slightly modified means for effecting the spacing at the inner ends of the electrodes and electrode assemblies 26, this being by extending the insulating layer or tape 32 farther about the edge of each anode plate 28 and applying it to the edges of the anodes 25 in such a manner that the cathode 30 of the adjacent electrode assembly (or cathode assembly) will rest against this insulating tape rather than shorting against the anode. In this embodiment the grooves 18 on the exterior surface of the core member 16 are eliminated. This construction permits a slightly closer packing of the electrodes in the battery assembly.

Since the construction of the battery features a number of very short electrodes, the voltage drop throughout the electrode length is minimized. Also, since there are no spacers or other obstructions between the electrodes of each cell, the electrolyte is permitted to flow freely through the reactive spaces in the cells resulting in the maximum uniformity of the voltage output of the battery. A large number of electrodes provides a very great area of contact between the electrodes and the electrolyte thereby permitting a very rapid activation of the battery to its maximum voltage. The structure is easily assembled and connected to provide the desired voltage output. Since the construction is a solid type construction, there is maximum reliability even after long periods of storage under conditions of high temperature and humidity, and the structure is very resistant to damage from vibration.

It is to be understood that the present disclosure has been made only by way of example and that additional modifications, changes, and various details may be resorted to without departing from the spirit and scope of the invention as hereinafter claimed.

What is claimed is:

1. A deferred action battery adapted for activation when immersed in sea water, a substantially tubular jacket, a substantially tubular core member smaller than said jacket and disposed coaxially within said jacket with the peripheral portions thereof being substantially uniformly spaced from the interior portions of said jacket, a plurality of electrodes extending outwardly from said core member intermediate said core member and said jacket, first nonconductive spacer means interiorly of said jacket for spacing of the outer end portions of said electrodes with respect to one another, second nonconductive spacer means exteriorly of said core member for spacing of the inner end portions of said electrodes with respect to one another, the spaces between said electrodes and the ends of said jacket being open whereby when said battery is immersed in sea water the sea water may freely pass between said electrodes in a direction parallel to the axis of said core member and jacket, and conductor means for drawing electric current from said electrodes.

2. The structure of claim 1 wherein said jacket and said core member are substantially cylindrical and said electrodes are disposed in radial array.

3. The structure of claim 1 wherein said first spacer means includes the inner surface portion of said jacket, said jacket inner surface portion being provided with a plurality of radial grooves, each groove adapted to receive and support an outer edge portion of one of said electrodes.

4. The structure of claim 1 wherein said battery is a primary battery and at least some of said electrodes are duplexed in bipolar assemblies, each assembly comprising a positive and a negative plate.

5. The structure of claim 4 wherein said positive plates are thicker and longer than said negative plates, and said first spacer means includes the inner surface portion of said jacket, said jacket inner surface portion being provided with a plurality of radial grooves, each groove adapted to receive and support an outer edge portion of one of said positive plates.

6. The structure of claim 5 wherein said negative plates are of silver chloride and said positive plates are magnesium.

7. The structure of claim 5 wherein there is provided a pair of concentric conductor rings, means connecting selected positive plates to one of said conductor rings and means connecting selected negative plates to the other of said conductor rings.

8. The structure of claim 1 wherein said second spacer means includes the outer surface portion of said core member, said core member outer surface portion being provided with a plurality of radial grooves, each groove adapted to receive and support an inner edge portion of one of said electrodes.

9. The structure of claim 1 wherein said second spacer means comprises a nonconductive layer adhering to and extending along the inner end portion on at least one side of one of the electrodes of each cell for engagement by the inner end portion of the other electrode of that cell.

10. The structure of claim 1 wherein means is provided for maintaining said jacket and said core member in fixed spaced coaxial relationship with respect to one another.

11. The structure of claim 10 wherein said means spacing said jacket and said core member is a member having radial arms, said member being disposed at one end of said jacket and core member in supporting relation with respect to said conductor means.

12. A deferred action battery adapted for activation when flooded with an electrolyte, said battery comprising a substantially tubular jacket, a substantially tubular core member smaller than said jacket and disposed coaxially within said jacket with the peripheral portions thereof being substantially uniformly spaced from the interior portions of said jacket, a plurality of electrodes extending outwardly from said core member intermediate said core member and said jacket, first nonductive spacer means on the interior of said jacket for spacing the outer end portions of said electrodes with respect to one another, second nonconductive spacer means on the exterior of said core member for spacing of the inner end portions of said electrodes with respect to one another, the spaces between said electrodes being open, whereby when said battery is flooded with an electrolyte, the electrolyte may freely pass between said electrodes in a direction parallel to the axis of said core member and jacket, said electrodes being arranged in a plurality of battery units, each unit having a cathode member, an anode member, and at least one bipolar electrode between said cathode member and said anode member, a pair of conductors, means connecting each of said cathode members to one of said conductors and means connecting each of said anode members to the other of said conductors, whereby said battery units are connected in parallel.

13. The structure of claim 12 wherein said battery is open at both ends whereby said battery may be activated by immersion into sea water.

14. The structure of claim 5 wherein said positive plates overextend said negative plates at both the outer and inner ends, and said second spacer means includes the outer surface portion of said core member, said core member outer surface portion being provided with a plurality of radial grooves, each groove adapted to receive and support an inner edge portion of one of said positive plates.

15. The structure of claim 1 wherein there is provided a pair of concentric conductor rings, and a member having radial arms disposed adjacent one end of said jacket, the radial arms of said member extending between said jacket and said core member to maintain said jacket and said core member in fixed, spaced, coaxial relationship with respect to one another, and said arms being affixes to said conductor rings for supporting said rings in fixed concentric relationship.

References Cited

UNITED STATES PATENTS

| | | | |
|---|---|---|---|
| 1,333,295 | 3/1920 | Drambourg | 136—14 |
| 2,742,520 | 4/1956 | Pucher et al. | 136—111 |
| 2,898,394 | 8/1959 | Williams | 136—90 |
| 2,979,552 | 4/1961 | Kuck | 136—90 |
| 3,005,864 | 10/1961 | Sharpe | 136—100 |
| 3,332,804 | 7/1967 | Zaromb | 136—113 XR |
| 3,369,937 | 2/1968 | Himy | 136—80 |

WINSTON A. DOUGLAS, Primary Examiner

A. SKAPARS, Assistant Examiner

U.S. Cl. X.R.

136—90, 100